United States Patent

Sauerwein

[11] 3,937,036
[45] Feb. 10, 1976

[54] ROTARY DRIVING TOOL HAVING A TORQUE RESPONSIVE CLUTCH

[75] Inventor: William Douglas Sauerwein, Joppa, Md.

[73] Assignee: The Black and Decker Manufacturing Company, Towson, Md.

[22] Filed: May 8, 1974

[21] Appl. No.: 468,027

[52] U.S. Cl. ............ 64/29; 192/56 R; 173/12; 81/52.4 A
[51] Int. Cl.² .......................... F16D 3/56
[58] Field of Search ............ 192/56 R, 150; 81/52.4; 173/12; 64/29

[56] References Cited
UNITED STATES PATENTS

| | | | |
|---|---|---|---|
| 3,398,611 | 8/1968 | Hahner | 192/56 R |
| 3,512,590 | 5/1970 | Jabbott | 173/12 |
| 3,578,091 | 5/1971 | States | 173/12 |
| 3,613,751 | 10/1971 | Juhasz | 192/56 R |
| 3,811,513 | 5/1974 | Wezel et al. | 173/12 |

Primary Examiner—Benjamin W. Wyche
Assistant Examiner—Randall Heald
Attorney, Agent, or Firm—Edward D. Murphy; Joseph R. Slotnik; Leonard Bloom

[57] ABSTRACT

A rotary power driven portable hand tool having a simplified torque responsive clutch assembly. The clutch includes a spindle having a radially outwardly extending flange, a clutch carrier rotatable about the flange, the clutch carrier carrying a plurality of clutch balls which are forced into engagement with one face of the flange by a compression spring being held in place by adjustable spring retaining means carried by the spindle. In one embodiment the face of the flange contacted by the balls is provided with a cam surface having a plurality of spaced apart recesses, there being a washer interposed between the balls and the end of the spring adjacent the balls. In a second embodiment a sleeve member is keyed to the spindle and is disposed between the compression spring means and the clutch balls, the sleeve member being reversible and having cam surfaces of different ranges on its opposed faces, one of which faces engages the balls to hold them against the face on the flange formed on the spindle.

13 Claims, 10 Drawing Figures 3,937,036

ROTARY DRIVING TOOL HAVING A TORQUE RESPONSIVE CLUTCH

FIELD OF THE INVENTION

The present invention relates generally to portable power tools of the type which are adapted to rotatably drive an output member, and more particularly, to a portable hand tool of the type referred to above in which torque responsive clutch means are provided to limit the output torque.

BACKGROUND OF THE INVENTION

Portable hand tools having torque responsive clutches which are coupled to a driven output member are well-known in the art. One such example is shown in U.S. Pat. No. 3,766,990 issued Oct. 23, 1973 to Eckman, et al. In the design shown in the patent a rotatable spindle, which is adapted to be interconnected with a driven output member, is in turn driven by a drive member through a torque responsive clutch. In Eckman, et al. a clutch carrier is secured to his output spindle, the clutch carrier supporting a plurality of clutch balls which engage a cam member having a plurality of spaced apart recesses. A compression spring normally biases the clutch balls into the recesses of the cam member but when an overload torque condition is encountered by the driven output member, the clutch balls will be cammed out of the recesses. In the design shown in the patent and in other well-known commercial variations of this form of torque responsive clutch it is necessary to provide thrust bearings of various forms which receive the thrust forces exerted by the spring, the thrust bearings transmitting the thrust forces either to the spindle in the manner shown in the Eckman, et al. patent or to a cylindrical housing disposed about the rotatable spindle in the manner shown in the U.S. Pat. No. 3,020,789 issued Feb. 13, 1964 to Etzkorn, the thrust bearing being indicated at 26 in this particular patent.

The foregoing designs are relatively difficult to assemble, and also are somewhat more costly than the design shown in this application in that they require thrust bearings.

OBJECTS AND SUMMARY OF THE INVENTION

It is a principle object of the present invention to provide a torque responsive clutch design of simplified construction which may be employed in portable power tools.

More particularly, it is an object of the present invention to provide a torque responsive clutch for a portable hand tool in which spring forces are transmitted directly to a rotatable spindle without the necessity of thrust bearings.

It is a further object of the present invention to provide a torque responsive clutch for use in a portable power tool in which the torque required to interrupt the drive can easily be varied within a given range.

A still further object of the present invention is to provide a torque responsive clutch for portable power tools in which various torque ranges may be provided.

Another object of this invention is the provision of an adjustable clutch screwdriver which is smaller in size for a given power output than prior devices.

It is also an object to provide an adjustable clutch screwdriver in which the torque increase during ratcheting after the clutch has disengaged is minimized.

These and other objects and advantages of the present invention are accomplished by providing a torque responsive clutch for a portable power tool in which a rotatable spindle is provided with an integral radially outwardly extending flange, by journalling a clutch carrier about the radially outwardly extending flange, the clutch carrier supporting a plurality of clutch elements in the form of balls for rotational movement with the clutch carrier, by disposing a spring about the spindle, and by providing retaining means adjustably interconnectable with the spindle to compress the spring, the spring normally biasing the balls into contact with one face of the flange. In a first embodiment the face of the flange is provided with a cam surface having a plurality of spaced apart recess means. In a second embodiment the sleeve member is interposed between the compression spring and the clutch balls, the sleeve member being rotatable with the spindle and having a cam surface on the radial face adjacent the clutch balls, the cam surface having a plurality of spaced apart recesses. In both modifications the clutch carrier is further provided with positive clutch teeth which may be selectively moved into and out of engagement with drive teeth on the drive means of the power tool.

DESCRIPTION OF THE PREFERRED EMBODIMENTS

Figure 1:
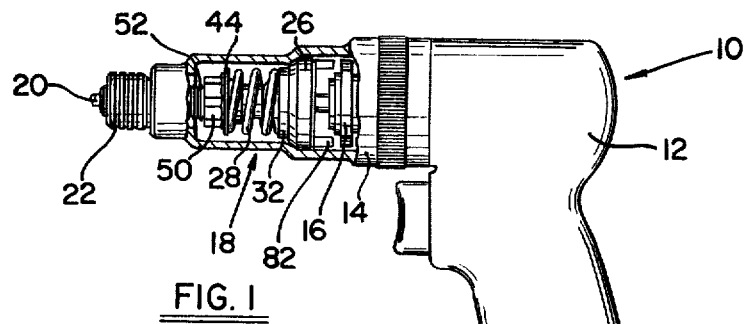
FIG. 1 is a plan view of a power tool incorporating the present invention wherein a portion of the housing has been broken away.

Referring first to the first embodiment shown in FIGS. 1 through 8 and more particularly to FIG. 1, the rotary power driven portable hand tool in which the principles of this invention are incorporated as indicated generally at 10. The tool includes a main housing 12, and a removable generally cylindrical housing portion 14. Mounted within the main housing 12 is a power source which may be an electrical motor, an air motor, or the like. The motor may receive its power source through a power cord or the like. The motor in turn is connected to driving means indicated generally at 16. The driving means is in turn interconnectable with a torque responsive clutch assembly indicated generally at 18, the torque responsive clutch assembly being mounted within the removable housing portion 14. The torque responsive clutch assembly is in turn interconnectable with a driven output member 20 by a retainer or the like, which is indicated at 22, the retainer or the like being mounted upon a portion of the torque responsive clutch assembly in a manner not material to the present invention. The details of the retainer or the like also are not material to the details of the present invention.

The torque responsive clutch assembly includes first and second members which are interconnectable with the drive means 16 and the driven output member 20. In the first preferred embodiment the first member is a rotatable spindle 24 which is interconnectable with the driven output means 20 and the second member is a clutch carrier 26 which is journalled about the spindle for independent rotational movement, the clutch carrier being interconnectable with the driving means 16 through a positive clutch arrangement which will be discussed below. It should be noted at this point that the rotatable spindle could be interconnected with the drive means and the clutch carrier 26 could be interconnected with the driven output member.

Figure 3:
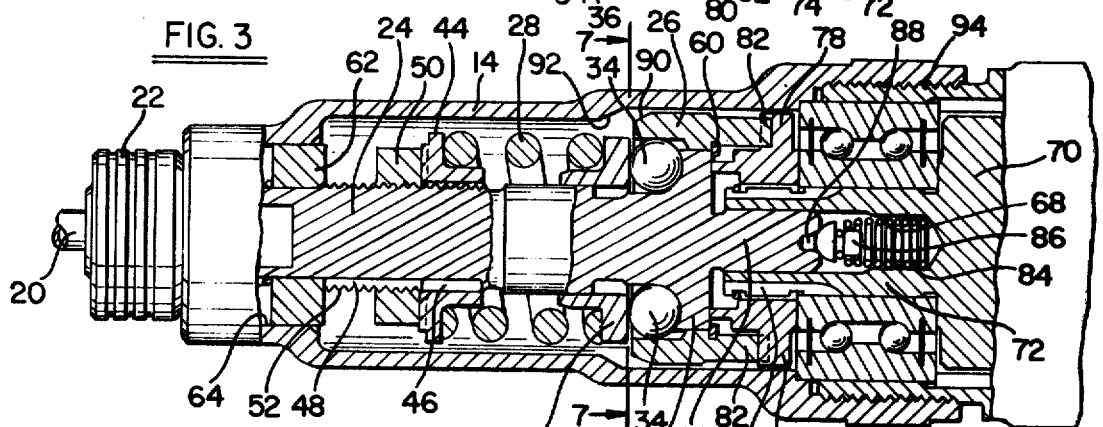
FIG. 3 is a view showing a portion of the tools shown in FIG. 1, the positive clutch teeth being shown in their engaged position and the torque responsive clutch also being shown in its engaged position.
Figure 4:
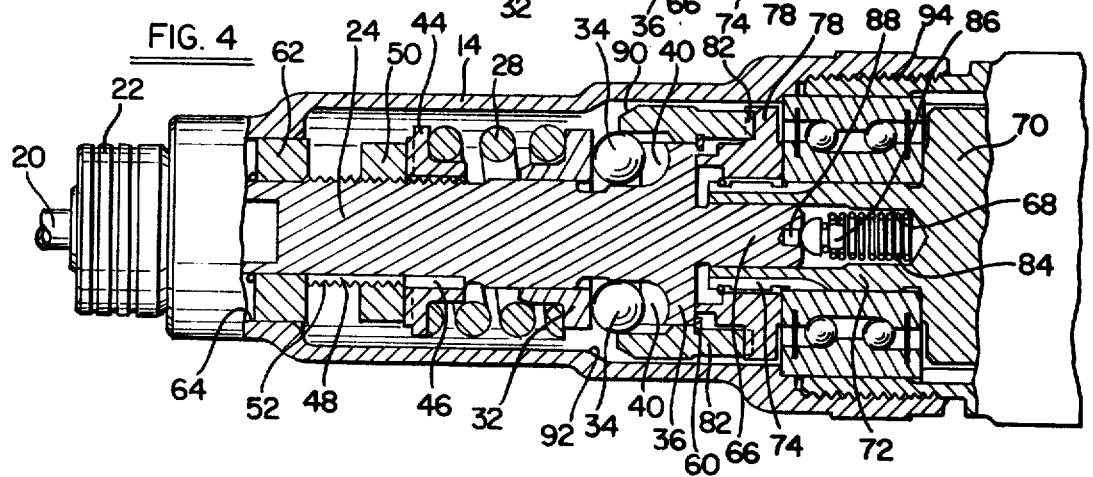
FIG. 4 is a view similar to FIG. 2 showing the positive clutch teeth in engagement and the torque responsive clutch in its disengaged position.
Figure 5:
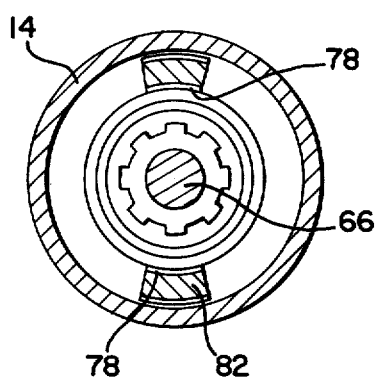
FIG. 5 is a section taken generally along the line 5—5 in FIG. 2, parts being eliminated for purposes of clarity.
Figure 6:
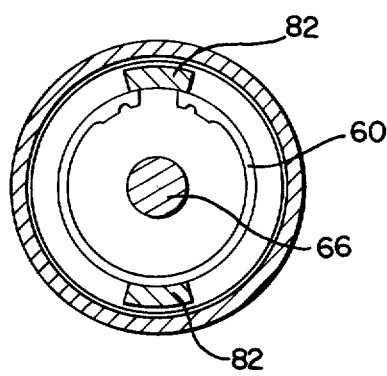
FIG. 6 is a section taken along lines 6—6 in FIG. 2.
Figure 7:
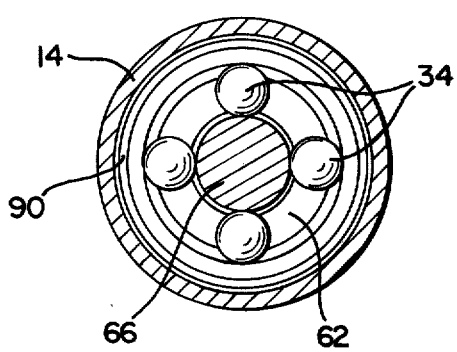
FIG. 7 is a section taken along a line 7—7 in FIG. 3.
Figure 8:
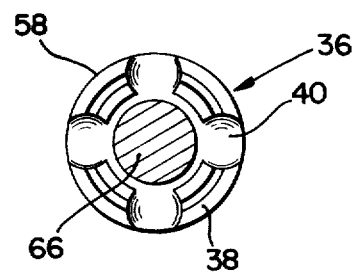
FIG. 8 is a sectional view of only the spindle, this section also being taken along the lines 7—7 in FIG. 3.
Figure 9:
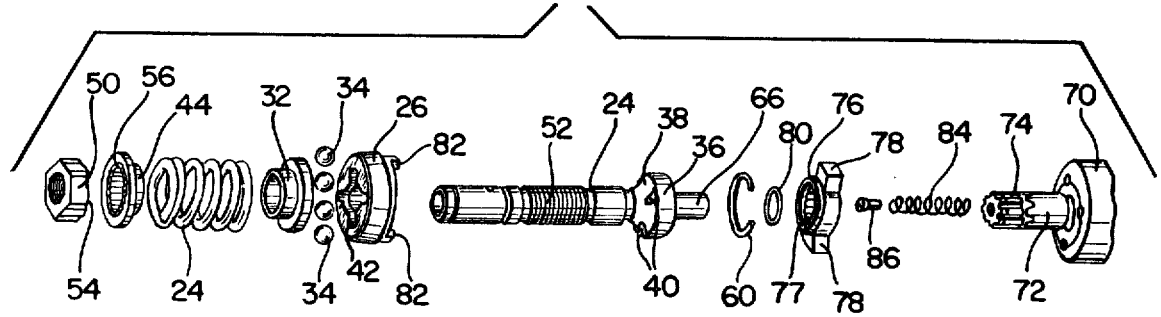
FIG. 9 is an exploded perspective view of various of the components shown in the preceding Figures.

The torque responsive clutch assembly includes, in addition to the rotatable spindle 24 and the clutch carrier 26, a compression spring 28 which is disposed about the spindle 24; spring retaining means indicated generally at 30, one end of the compression spring 28 being held in compression by the spring retaining means; a washer 32 disposed adjacent the other end of the compression spring; and a plurality of clutch elements or clutch balls 34 which are carried by the clutch carrier 26. The spindle 24, which is best illustrated in FIG. 9, includes a radially outwardly extending flange portion 36 which is preferably formed integrally with the spindle, one face 38 of the flange 36 being provided with a cam surface having a plurality of spaced apart recess means 40. In the normal operative position of the tool, which is shown in FIG. 3, the spring 28, which is held in compression between the spring retaining means 30 and the face 38 on the flange portion 36, will force the clutch balls 34 into the spaced apart recesses 40. This will establish a driving relationship between the clutch carrier 26 and the spindle 24 as the balls 34 are rotatable with the clutch carrier. Thus, the clutch carrier is provided with cylindrical pockets 42 which receive the balls 34, the axis of the cylindrical pockets being parallel to the axis of the clutch carrier and lying along a cylindrical locus concentric with the axis of the clutch carrier. The balls can only shift along the axis of the pockets.

The spring retaining means is longitudinally adjustable about the axis of the spindle and includes a washer 44, the washer being provided with a key 46 which is received within a longitudinally extending groove 48 on the spindle. Thus, the washer is held from rotation relative to the spindle but can be shifted longitudinally along the axis of the spindle. The spring retaining means also includes a nut 50 which is internally threaded and is in turn threaded onto the threads 52 of the spindle. The adjacent faces 54, 56 of the nut and washer, respectively, are provided with an irregular mating surface which can best be seen in FIGS. 2 and 9. When the spring is compressed the washer 44 will bear against the nut 50 and the mating surface 56 of the washer will engage the mating surface 54 of the threaded nut to hold the nut from rotation. By adjusting the spring retaining means 30 (by rotating the nut on a threaded portion 52 of the spindle) the compressive force of the spring can be varied to vary the torque required to move the clutch elements 34 out of the corresponding spaced apart recess means 40.

The clutch carrier 26 is journalled about the outer edge 58 of the flange 36 and is held from longitudinal shifting movement relative to the spindle by a retaining ring 60 and the forward portion of the clutch carrier 26 which contacts the face 38 of the flange between the bores or pockets 42. The spindle 24 is journalled at its forward end by a bearing sleeve 62 which is secured to the spindle, the outer surface of the bearing sleeve 62 bearing against an internal bearing surface 64 of the removable housing portion 14. The other end of the spindle 24 is provided with a cylindrical extension 66 which is journalled for rotation within a corresponding recess 68 in one of the elements of the driving means 16.

The driving means 16 includes a first driving member 70 which is interconnected with the motor in the tool, the first driving member including a shaft 72 provided with external splines 74, the end of the shaft 72 next to the torque responsive clutch assembly being provided with the recess 68 that receives the cylindrical extension 66 of the spindle 24. The second driving member 76 is provided with internal splines 77 and is disposed over the splines 74 on the cylindrical shaft 72 of the first driving member to be driven thereby, the second driving member including radially outwardly extending clutch teeth 78 for effecting a positive clutch interconnection with the carrier 26. The second driving member 76 is held on the spline shaft 72 by the retaining ring 80. The positive clutch teeth 78 on the second drive member are adapted to be meshed with corresponding positive clutch teeth 82 on the clutch carrier 26. A compression spring 84 is mounted within the recess 68, one end of the spring 84 carrying a pin 86 having a rounded head which engages the periphery of a small cylindrical counter-bore 88 in the end of the cylindrical extension 66.

Figure 2:
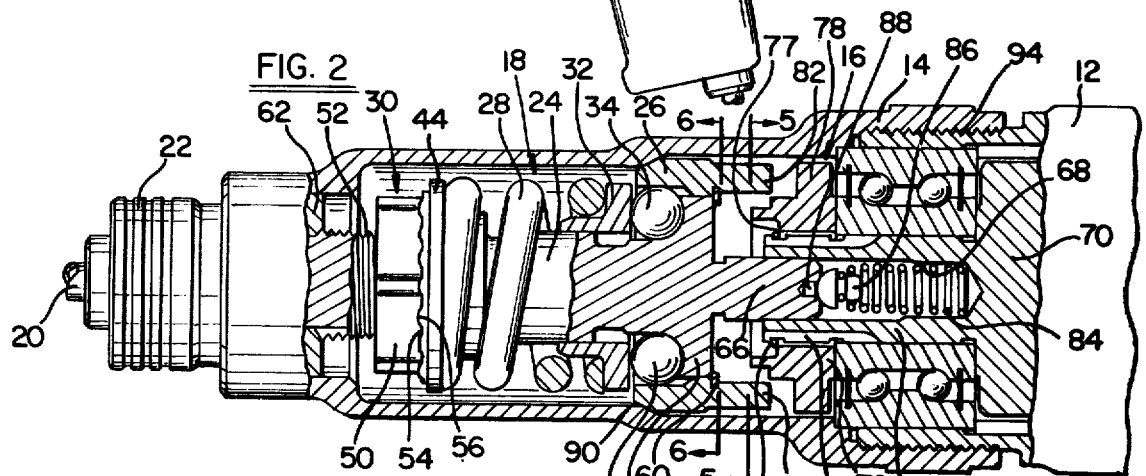
FIG. 2 shows a portable power tool in which the principles of the present invention have been incorporated in a first embodiment, parts of the tool being shown in section, the positive clutch teeth being shown in their disengaged position, and the torque responsive clutch being shown in its engaged position.

The operation of the modification shown in FIGS. 1 through 8 is as follows:

When the parts are at rest they are in the position shown in FIG. 2. In this position the compression spring 84 and pin 86 through the engagement with the periphery of the cylindrical counter-bore 88 will force the torque responsive clutch assembly to the left until the tapered surface 90 on the clutch carrier contacts a corresponding tapered surface 92 on the removable housing portion 14. When the parts are in this position the positive clutch teeth 78, 82 will be disposed in a position where they cannot engage each other, thus positively interrupting the drive to the torque responsive clutch assembly. In order to start driving the driven output member 20 it is necessary to shift the torque responsive clutch assembly to the right to cause the teeth 78, 82 to become engaged. This is accomplished simply by exerting a force upon the driven output member to shift it to the right and after it has been shifted to the right the parts will be disposed in the manner indicated in FIG. 3. Thus, the torque responsive clutch assembly has been shifted to the right to cause the teeth 78, 82 to mesh. The tapered surfaces 90, 92 are no longer disposed in engagement with each other. In addition, the sleeve bearing 62, the retainer 22 and the driven output member 20 have also been shifted to the right. This condition could obviously take place when the driven output member is the bit of a screwdriver which is being brought to bear against a screw that is to be threaded into a workpiece. If the force to the right which is being exerted upon the driven output member 20 were removed the parts will again be shifted to the left by the action of the spring 84, the various shiftable parts assuming the position shown in FIG. 1 with the tapered surfaces 90, 92 interengaging each other and preventing the spindle from rotating.

Should an overload torque condition be encountered by the driven output member 20 after the positive clutch teeth have been engaged the clutch element or balls 34 will ride out of the spaced apart recesses 40 and ratchet about the recesses while effecting a preset driving torque condition between the clutch carrier 26 and the rotatable spindle 24. When this condition occurs the parts will be disposed in the position shown in FIG. 4 and it can be seen that the spring has been further compressed and the balls have moved out of the recesses 40.

All of the forces exerted by the spring 28 are received by the spindle 24. The force exerted by the left hand end of the spring is transmitted to the spindle through the washer 44, nut 50 and threads 52 and the force exerted by the right hand end of the spring 28 is transmitted to the spindle through the washer 32, clutch element 34, and face 38 of the outwardly extending flange 36.

The torque required to overload the torque responsive clutch assembly may be varied within a torque range by merely adjusting the threaded position of the nut 50. Thus, by moving the nut to the left the torque required to override the clutch is reduced. Similarly, by threading the nut to the right the torque required to overload the clutch is increased. In addition, the torque range may be varied by substituting stronger or weaker springs 28. The servicing and adjustment of the clutch is easily accomplished by unscrewing the removable housing portion 14 from the main housing 12 and this is accomplished through the provision of threads 94 between the two portions of the housing.

Figure 10:
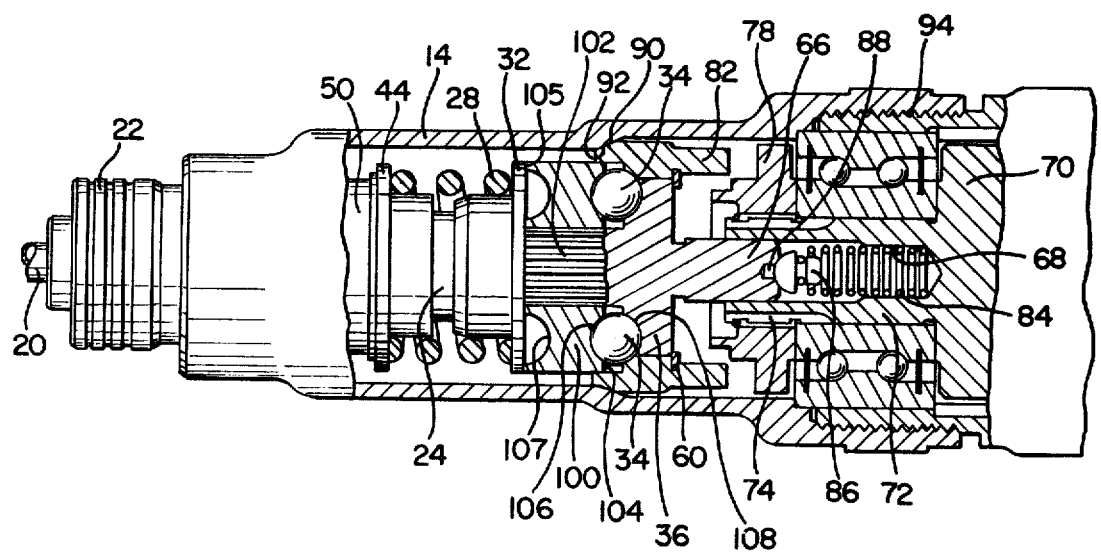
FIG. 10 is a view illustrating a second embodiment of the present invention, this view being comparable to FIG. 2.

In FIG. 10 a second modification is illustrated. This modification differs from the modification shown in FIGS. 1 through 9 in that a sleeve member 100 is mounted about a rotatable spindle, the rotatable spindle being provided with splines 102 which cooperate with internal splines on the sleeve member. Thus, the sleeve member is free to shift longitudinally with the spindle but must rotate therewith. The faces 104, 105 of the sleeve member are provided with cam surfaces having spaced apart recess means 106, 107, the recesses 106 being of a differing depth than the recesses 107. The face of the flange 36 which is contacted by the clutch elements or balls 34 is not provided with a cam surface but is provided with a continuous groove or ball track 108. In this modification, when an overload torque condition is encountered the sleeve member 100 will be shifted to the left permitting the clutch elements 34 to ratchet about the recesses formed in the associated face. One advantage of this design is that the torque ranges may be varied by removing the sleeve member from the spindle and reversing it so that a second torque range may be provided for without the necessity of carrying loose parts in the form of additional springs of different strengths as would be required in the first modification. Within each torque range the torque may be varied by simply adjusting the nut 50 in the manner previously described.

While preferred structures in which the principles of the present invention have been incorporated are shown and described above, it is to be understood that the invention is not to be limited to the particular details shown and described above, but that, in fact, widely different means may be employed in the practice of the broader aspects of the invention.

What is claimed is:

1. In a rotary power driven portable hand tool having drive means and adapted to receive driven output means, the combination therewith of a torque responsive clutch comprising:

a clutch carrier and a rotatable spindle interconnected with said drive means and the driven output means, respectively, said clutch carrier being journalled about said spindle for independent rotational movement;

first radial face means formed integrally on said spindle, second radial face means confronting said first radial face means, one of said face means being provided with a cam surface having spaced apart recess means, and at least said one face means being rotatable with said spindle;

a plurality of clutch elements rotatable with said clutch carrier, said clutch elements being disposed between said confronting face means;

compression spring means disposed about said spindle, one end of the compression spring means being operable to bias one of said face means axially toward the other face means whereby said clutch elements are normally forced into said spaced apart recess means; and spring retaining means mounted upon said spindle and operative to engage the other end of a compression spring means to hold said compression spring means in compression;

the parts being so arranged and constructed that when overload torque conditions are encountered by the driven output means the clutch elements will move out of said spaced apart recess means to temporarily interrupt the drive between said first and second members, said clutch elements automatically moving back into said spaced apart recess means to reengage the drive between said first and second members when said overload torque conditions are removed, and the forces exerted by said spring at all times being transmitted to the spindle by the spring retaining means and said first face means being independent of thrust bearing means.

2. The rotary power driven portable hand tool set forth in claim 1 in which said spring retaining means is mounted for longitudinal adjustment along the axis of said spindle, whereby the force exerted on the clutch elements by said compression spring means may be varied to vary the torque required to move the clutch elements out of their associated spaced apart recess means.

3. The rotary power driven portable hand tool set forth in claim 2 in which said spring retaining means includes a washer keyed about the axis of said spindle, one face of said washer engaging the compression spring means, and a nut threaded about said spindle, one face of said nut engaging another face of said washer and being provided with mating irregular surfaces.

4. The rotary power driven portable hand tool set forth in claim 1 wherein said clutch carrier is journalled about the radially extending flange of said spindle.

5. The rotary power driven portable hand tool set forth in claim 1 wherein said clutch carrier is provided with positive clutch means selectively engagable with one of said drive means or said driven output means.

6. The rotary power driven portable hand tool set forth in claim 1 wherein said clutch carrier is provided with a plurality of cylindrical pockets which extend longitudinally relative to the axis of the spindle, the axis of said cylindrical pockets lying along a cylindrical locus concentric with the axis of the clutch carrier, said clutch elements being balls received within said cylindrical pockets.

7. The rotary power driven portable hand tool set forth in claim 1 wherein said cam surface is formed on one face of a sleeve member keyed about said spindle for longitudinal shifting movement about the axis of this spindle and for rotational movement with said spindle.

8. The rotary power driven portable hand tool set forth in claim 7 wherein said sleeve member is provided with a cam surface on the other of the radially outwardly extending faces, one of the cam surfaces being provided with spaced apart recessed means of a greater depth than other cam surface, the parts being so arranged and constructed that the sleeve can be reversed about said spindle to vary the output torque of the torque responsive clutch.

9. In a rotary power driven portable hand tool adapted to receive driven output means and having drive means mounted within a housing, the combination therewith of a torque responsive clutch comprising:

a rotatable spindle journalled for rotational movement about its axis within the housing and interconnectable to said driven output means, said spindle having a radially outwardly extending flange formed integrally thereon;

a clutch carrier journalled about said spindle for independent rotational movement generally about the axis of the spindle, the clutch carrier being interconnectable to said drive means;

a plurality of clutch balls rotatable with the clutch carrier, the clutch balls being disposed adjacent a radially outwardly extending face on said flange, said face being provided with a cam surface having spaced apart recess means;

a washer disposed about said spindle;

compression spring means disposed about said spindle, one end of the compression spring means being operable to bias one face of said washer into engagement with said clutch balls in a direction towards the cam surface whereby the clutch balls are normally forced into said spaced apart recess means; and spring retaining means mounted upon said spindle and operable to engage the other end of the spring means to maintain said compression spring means in compression;

the parts being so arranged and constructed that the compression spring means normally holds the balls in said spaced apart recess means to establish a clutched drive between said clutch carrier and said spindle, the clutch balls being movable out of the spaced apart recess means when overload torque conditions are encountered by the spindle whereby the drive between the clutch carrier and the spindle is temporarily interrupted, the clutch balls automatically moving back into said spaced apart recess means to reengage the drive between the clutch carrier and spindle when said overload torque conditions are removed.

10. The rotary power driven portable hand tool set forth in claim 9 wherein said clutch carrier is further provided with positive clutch means selectively engagable with said drive means whereby said clutch carrier can be positively clutched independently of the torque responsive clutch.

11. The rotary power driven portable hand tool set forth in claim 10 wherein the positive clutch means on said clutch carrier includes longitudinally extending teeth engagable with cooperating teeth on said drive means, and further characterized by the position of means to normally bias said torque responsive clutch means away from said drive means so that the positive clutch is not normally engaged, said torque responsive means being shiftable towards said drive means by applying pressure at one end of the spindle remote from said clutch carrier whereby the clutch carrier may be engaged by the drive means.

12. In a rotary power driven portable hand tool having drive means mounted within a housing, the tool also being adapted to receive driven output means, the combination therewith of a torque responsive clutch comprising;

a rotatable spindle journalled for rotational movement about its axis within said housing and interconnectable to said driven output means, said spindle having a radially outwardly extending flange;

a clutch carrier journalled about said spindle for independent rotational movement about the axis of said spindle, said clutch carrier being interconnectable to said drive means;

a plurality of clutch balls rotatable with said clutch carrier, said balls being disposed adjacent a radially outwardly extending face on said flange;

a sleeve member keyed about said spindle for longitudinal shifting of movement about the axis of said spindle and for rotational movement with said spindle, a radially outwardly extending face of said sleeve member being provided with a cam surface having spaced apart recessed means, said last mentioned face being disposed adjacent said clutch balls;

compression spring means disposed about said spindle, one end of the compression spring means being operable to bias said last mentioned face into engagement with said clutch balls in a direction towards the face on the flange whereby said clutch balls are normally forced into said spaced apart recess means; and spring retaining means mounted upon said spindle and operable to engage the other end of the compression spring means to hold said compression spring means in compression.

13. The rotary power driven portable hand tool set forth in claim 12 wherein said sleeve member is provided with opposed radially outwardly extending faces, both of said faces being provided with a cam surface having spaced apart recess means, and wherein the spaced apart recess means on one of the faces extend to a greater depth than the spaced apart recess means on the other of said faces, the parts being so constructed and arranged that the sleeve member may be reversed whereby the output torque ranges can be varied.

* * * * *